May 22, 1962   H. DERSCHMIDT   3,035,644
ROTARY WING OR BLADE SYSTEMS FOR HELICOPTERS
Filed July 13, 1960   4 Sheets-Sheet 1

Inventor:
HANS DERSCHMIDT

Inventor
HANS DERSCHMIDT

May 22, 1962 H. DERSCHMIDT 3,035,644
ROTARY WING OR BLADE SYSTEMS FOR HELICOPTERS
Filed July 13, 1960 4 Sheets-Sheet 4

Inventor:
HANS DERSCHMIDT

United States Patent Office 3,035,644
Patented May 22, 1962

3,035,644
ROTARY WING OR BLADE SYSTEMS
FOR HELICOPTERS
Hans Derschmidt, Bernhausen, Wurttemberg, Germany, assignor to Bölkow-Entwicklungen Kommanditgesellschaft, Ottobrunn, near Munich, Germany
Filed July 13, 1960, Ser. No. 42,699
Claims priority, application Germany July 9, 1955
7 Claims. (Cl. 170—160.25)

The present invention relates to rotary wing or blade systems for use in helicopters and like aircraft, and has as one of its objects the provision of means tending to improve the flight and stability characteristics of such helicopters. The present application is a continuation-in-part of my prior application Serial No. 596,558 filed July 9, 1956, now Patent No. 2,957,526, issued October 25, 1960.

Presently known helicopters or aircraft with rotary wing systems are limited with respect to their maximum attainable horizontal velocity because the air flow around the airfoil surfaces of the propeller blades becomes more non-uniform the higher the horizontal velocity. The maximum attainable velocity is actually determined on the one hand by the fact that the air speed of the forwardly moving foil surfaces or blade approaches the speed of sound and on the other hand by the fact that the rearwardly moving surfaces are contacted by air moving at such low speeds that the lift action of these surfaces breaks down periodically.

In order to displace or shift the presence of lift breakdown as far as possible into the range of high horizontal or ground speeds, the known rotary blade or wing systems are so selected, when they are intended to operate at relatively high horizontal velocities, that the blade tips move at high uniform peripheral velocities. A great amount of power input is required to overcome the resistance of the blade profile when the non-uniformity of the air stream against the blades is to be minimized through the use of high, uniform peripheral speeds.

The non-uniformity of the incident air stream during rotation of the blades is the fundamental reason why the known rotary wing systems can attain only relatively small horizontal velocities.

In known rotary wing aircraft as aforesaid, the non-uniform streaming of air around the blades during horizontal flight is compensated for or balanced out by wobbling movements or by periodical changing of the adjustment angle, i.e., by feathering of the blades, so that the moment equilibrium is effected about the longitudinal axis. In such cases, however, the lift characteristics of each of the individual foil or blade elements are necessarily altered very greatly during each rotation.

Usually, therefore, profiles or blades are selected which are especially constructed for relatively small lift forces and which are relatively thin. In this manner, it is possible to avoid subjecting the forwardly moving foil elements to an especially high load for overcoming the air foil resistance.

The efficiency of such thin blades or profiles, which are subjected to greatly changing lift factors or coefficients, has its mean value, for any one rotation, below the efficiency of a profile of greater thickness which is subjected to a less changing or constantly high lift factor during any one rotation. This may be compared with a rotary wing system operating during suspended flight and the profile of which is especially determined for constant high lift values.

The non-uniform contact of foils of known rotary wing systems by the air stream in horizontal flight results in a smaller mean profile efficiency for each rotation and makes it necessary to choose thinner profiles which, even in suspended flights, have greater power requirements, their very thinness affecting the rigidity and strength of the air foils or blades adversely.

In known systems of this type, the non-uniform incident air flow past the blades during horizontal flight results in recognized instability when contrasted with longitudinal inclinations in the case of ordinary lifting propellers. The higher peripheral velocities of the blade ends or tips required in the known aircraft for attaining higher horizontal speeds reduce the damping of the rotor in contrast with tilting disturbances.

Thus, the known lifting propellers can only be controlled with great difficulty or they require special, highly complex arrangements for their stabilization.

The above-mentioned high peripheral foil tip speeds required in known rotary wing systems cause greater noises even during suspended flight. When a helicopter moves forwardly at higher horizontal speeds, the forwardly moving blades will be subjected in a shock-like or impact-like manner to air flowing at very high velocities. The consequently recurring slapping noise is usually found to be more irritating than the noise of propellers of airplanes having rigid wings.

It is, therefore, also one of the primary objects of the invention to provide means improving the performance and stability qualities of rotary blade or wing systems of the aforesaid type.

It is another object of the present invention to provide means contributing to counteraction or elimination of the action of non-uniformity of the air stream against helicopter or like aircraft blades during rotation of the latter, whereby the horizontal speed of said aircraft equipped with such a rotary blade system may be markedly increased.

To these ends, the invention resides substantially in the fact that the blades, besides the uniform rotational movements, execute positive additional movements in the plane of rotation of the rotor. Through these additional movements, the non-uniformity of the airstream flowing against the blades at high horizontal speeds and small mean peripheral velocity of the blade tips is reduced or balanced out.

For a rotary wing system according to the invention, a condition obtains in horizontal flight which is similar to that which exists in suspended flight.

A further object of the invention is to provide means enabling all those disadvantages of the known devices which result from the necessary high peripheral velocity of the blade tips and from the large non-uniformity of the air flow about the blades to be minimized or completely eliminated.

Yet a further object of the present invention is the provision of means affording a novel and improved rotor structure for use in helicopters and like aircraft, which structure exhibits a great number of advantages with respect to known arrangements of this type.

According to another object of the invention, means are provided to ensure that the blade tips may be moved with substantially reduced peripheral velocities.

Still another object of the invention is to provide means conducive to thicker profiles with high lift coefficients in rotor structures as aforesaid which, in conjunction with the great rotor diameters employed, make possible the expenditure of minimum power during suspended flight.

Another advantage resulting from the implementation of the above objects is that the rotary wing system can attain higher horizontal speeds with less power requirements, it is easier to control, and it suppresses irritating noise to a greater extent than has heretofore been possible.

During the swinging movements of the blades, an additional movement thereof in the rotor plane in constrast to the uniform rotation of the rotor hub is executed. Upon accurately controlled swinging movements during one rotation in horizontal flight, the non-uniformity of the incidence of the air stream can be balanced out, especially for the aerodynamically most effective outer parts of the blades.

This is the case when the forwardly moving blades are retarded with respect to their mean rotational speeds and when the rearwardly moving blades are accelerated with respect to their mean rotational speeds.

The known swinging movement, which tends to adjust itself in accordance with the free play of forces, exhibits, however, a general phase displacement relative to the construction according to the invention, which latter has the desired operation, or in other words the non-uniformity of the air stream incident on freely swinging blades is greater than that of the air stream incident on blades without swinging movement.

In known rotary wing or blade systems, the swinging movement is, thus, damped by special mechanism in order to prevent increase of the air flow non-uniformity above controllable limits. Only by positively operating drive or control means as provided by the present invention can the additional blade movements be attained which, during horizontal flight, at all times minimize the non-uniformity of air flow against and about the blades.

These and other objects of the invention will become further apparent from the following detailed description, reference being made to the accompanying drawings, showing preferred embodiments of the invention.

Figure 1:
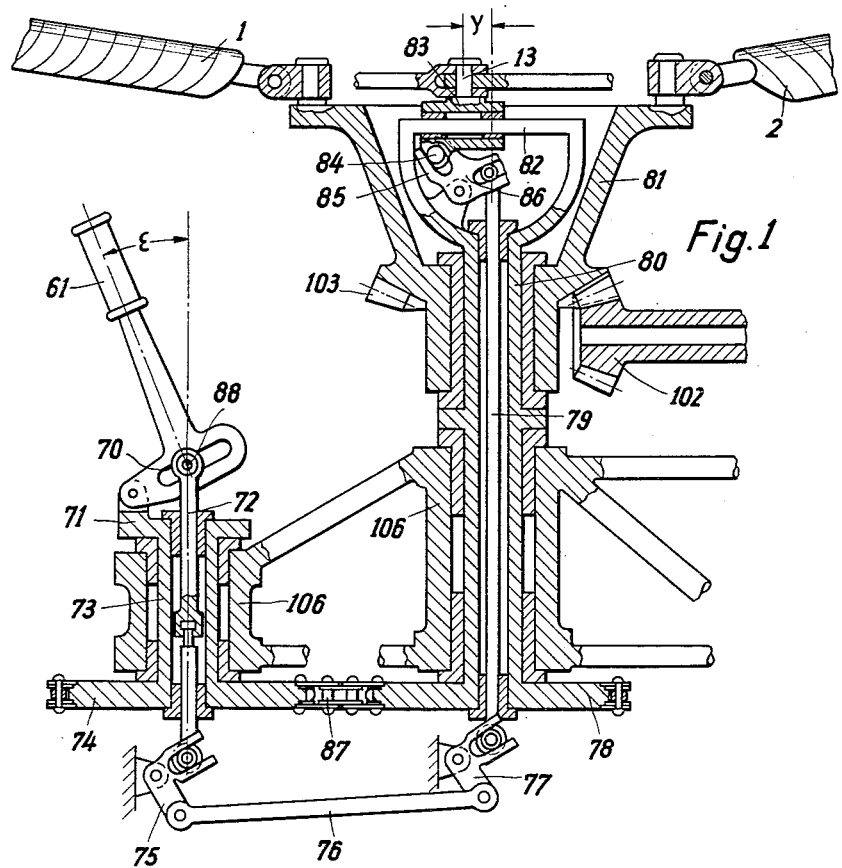
FIG. 1 is a vertical sectional view taken through a control device pursuant to the present invention.

Referring now more particularly to the drawings, FIG. 1 discloses an arrangement in which movement of the control stick 61 readily adjusts the position of the eccentric pin 13. The angle of movement $\epsilon$ of the control stick 61 corresponds to the displacement $y$ of the eccentric pin 13. Thus, the swinging movement $\alpha$ of the blades (FIG. 2) may be readily achieved. This occurs through creation of differences in speed of the oncoming air stream for the blades at opposite sides thereof.

Figure 2:
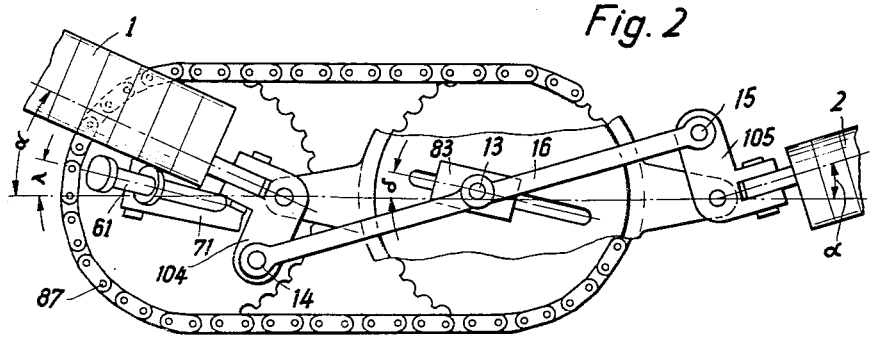
FIG. 2 is a top plan view of FIG. 1.

As can be seen from FIGS. 1 and 2, the control stick 61 is pivoted on a support 71. This support is joined with the sprocket or chain wheel 74 by means of tubular shaft 73 which is rotatably mounted on the fuselage 106. Slide pin 88 of the control rod 72 is engaged in a guide slot or guideway 70 of the control stick 61. The bell crank levers 75 and 77 are also pivoted on the fuselage, and are connected, respectively, to control rods 72 and 79. Levers 75 and 77 are interconnected by link 76. The pivotally mounted bell crank 86, which receives pin 84 in guideway 85, is connected to a support 83 which carries eccentric pin 13.

Support 83 is adjustably carried on guide rod 82. Tubular shaft 80, which is rotatably supported in a bearing of the fuselage, is connected to guide rod 82 on the one hand and to sprocket or chain wheel 78 on the other hand. Chain 87 is trained over the sprocket wheels 74 and 78 (FIG. 2).

Eccentric pin 13 is carried as aforesaid by support 83, pin 13 being operatively connected with pins 14 and 15 by links 16 and 17. Pins 14 and 15 are connected to the ends of bell cranks 104 and 105, respectively, which in turn are pivotally connected to blades 1 and 2 and extend at right angles to pins 14 and 15. The rotary hub 81 is driven by a bevel gear arrangement 102, 103 as is evident from FIG. 1.

If the control stick 61 performs an angular displacement $\lambda$, support 71, sprocket wheels 74, 78, and guide bar 82 will be angularly displaced to the amplitude $\sigma$ which is equal to $\lambda$.

If the control stick 61 performs an angular displacement $\epsilon$, control rod 72, 79 via link 76 and support 83 will be displaced, resulting in an eccentricity $y$ of the eccentric pin 13. Upon changing the displacement $\epsilon$ and $\lambda$ of the control stick 61, the eccentricity of the eccentric pin can be adjusted and controlled as to size and angularity.

If the rotor hub 81 rotates, pins 14 and 15 are moved radially, from which a lagging movement of the blades results corresponding to respective positions shown in FIGS. 1 to 13 of my prior application. Thus, it is possible to obtain control effects for the blades of the rotary blade system.

Figure 3:
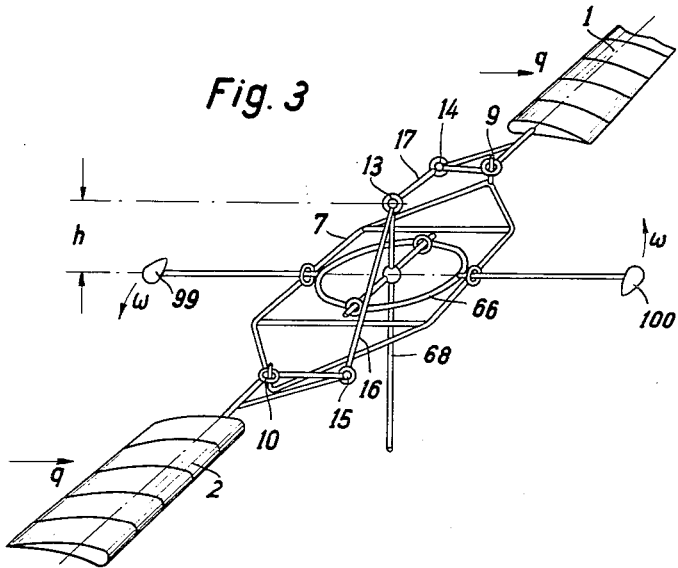
FIGS. 3 and 4 illustrate two different control positions of a rotary system with improved natural stability qualities and illustrate another embodiment of the invention.
Figure 4:
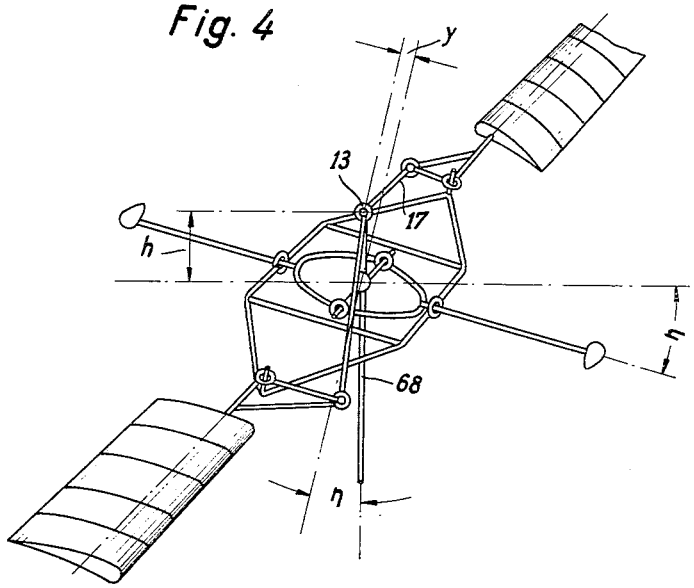

According to FIGS. 3 and 4 hub 7 is pivoted by means of a gimbal 66 on rotor beam 68. Blades 1 and 2 and suitable hinges 9 and 10 are pivotally connected by means of connecting rods 16, 17 to a ball and socket joint corresponding to the eccentric pin 13. Axial difference $h$ in height is provided between the ball joint 13 and the center of the gimbal. Counter weights 99 and 100 are guided by centrifugal forces and serve as stabilizers.

Hub 7 rotates around the axis with angular speed $w$. The ball joint then presents no eccentricity relative to the axis of the beam and the blades 1 and 2 are prevented from performing a swinging movement due to the connecting rods 16 and 17. Assuming that to these blades during hovering conditions a horizontal gust $q$ is applied, the lift of a blade 1 advancing relative to the gust will be higher than the lift of blade 2 receding with the gust. The blades begin to flap and the rotor disk will be tilted backward at an angle of $n$ (FIG. 4).

As the beam 68, due to inertia, remains in its previous position, an eccentricity $y$ results due to the difference in height $h$ of the ball joint end, and swinging movements of the blades are initiated by said connecting rods. Through controlled swinging movements, the blades have nearly no fluctuation of blast although the gust remains effective and a lift balance between the two blades is attained, as it were the case during hovering condition, before a gust occurred.

The bell crank lever means 13, as shown in FIGS. 3 and 4, function as a bell crank only when an inclination of the plane in which the rotor normally moves with respect to the rotor axis takes place. Location of 13 is generally vertically above the rotary axis and becomes effective as an eccenter upon inclination of the rotor relative to said axis of rotation of the rotor.

Only in this position and under these circumstances, namely if the rotor is tilted relative to its axis upon occurrence of disturbances of flow of air or of gusts, the blade movement according to the invention is caused by the eccentric positioning of crank 13, while during hovering action without disturbances the eccentricity becomes zero, so that oscillatory movement of the blade system is avoided.

Figure 5:
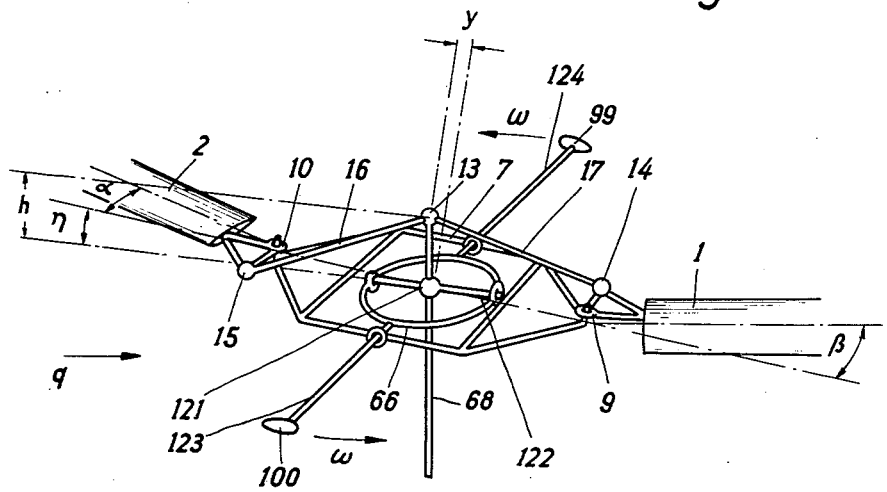
FIG. 5 is a side view of a rotor according to FIG. 4, the rotor being displaced by approximately 90 degrees.
Figure 6:
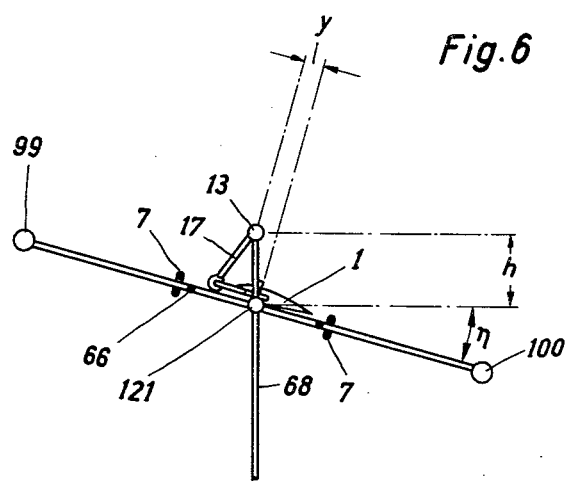
FIG. 6 is a sectional view of a rotor pursuant to FIG. 4.

This movement of the blade system may be derived from a construction according to FIGS. 3 and 4 and becomes still clearer from FIGS. 5 and 6.

In FIG. 5 the rotor of FIG. 4 is rotatably advanced about 90° with an inclination against the horizontal about an angle η. The location of the rotor blades here indicated corresponds about to the position seen in FIG. 10 of my prior application.

The cardan ring 66 pivotally journalled about axis 122 and suspended on arms 123, 124, as well as the weights 99 and 100, lies in a plane perpendicular to the rotary shaft axis 68.

The remainder of the rotor is inclined at an angle of η. Due to this inclination an eccentricity y of the bell crank 13 is established, which eccentricity y causes the drive means 16, 17, 14, 15 to effect an oscillatory movement of the blades according to FIGS. 1 to 14 of my prior application.

However, the cause for this oscillatory movement is not the air flow against the blades in forward flight but the non-uniform air flow occasioned by a gust encountered.

This embodiment according to which the eccentricity y changes in dependence of the rotor inclination may be readily derived from the embodiment of FIGS. 1 to 14 of my prior application shown as equipped with a rather fixed and not changeable eccentricity. The pivot point of 13 lies in such case outside of the rotary axis as well as about a distance "h" above the plane, in which the pivotal connectors 14, 15 circulate.

Figure 7:
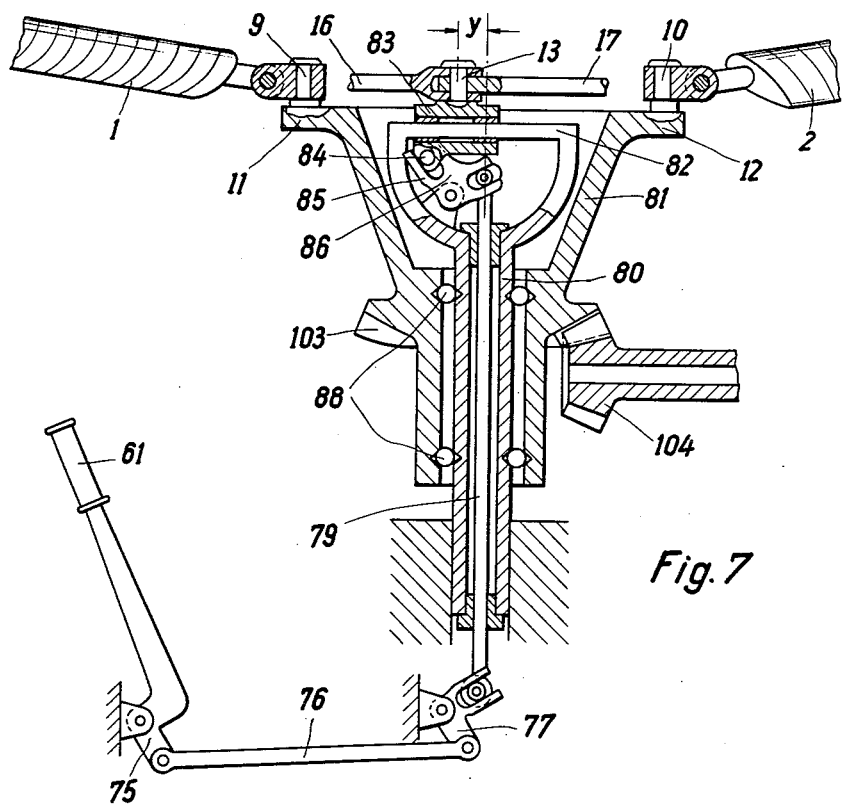
FIGS. 7 and 8 are views similar to FIGS. 1 and 2, respectively, and illustrate simplified constructions.
Figure 8:
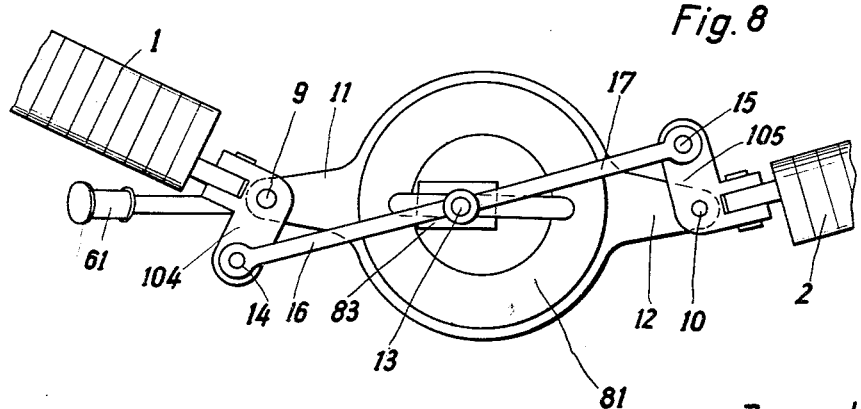

As previously indicated, an important feature of the present invention resides in the fact that the eccentricity is regulatable or adjustable as shown in FIGS. 1 and 2. FIGS. 7 and 8 are simplified versions of the construction shown in FIGS. 1 and 2 and further illustrate the adjustability of the eccentricity.

By employment of hand lever 61 the eccentricity of 13 may be changed via links 75, 76, 77, 79, 86 and 84. Adjustability in regard of the direction of eccentricity can also be brought about.

According to FIGS. 7 and 8 the slide rail 82 at the rotor head sleeve 80 is fixedly adjusted in the direction of longitudinal flight. Sleeve 80 and ball bearing 88 serve to determine the journal of rotor head 81.

The drive for the rotor head occurs in like manner as in FIG. 1 by means of bevel gears 103, 104. The change of eccentricity by sliding bolt 13 together with the guide member 83 along glide rail 82 is effectuated by hand lever 61 via levers 75, 76, 77, 79, 86, 85, 84. Due to a corresponding ratio, the change of eccentricity y may be effected within any desired limits.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a rotary blade system for aircraft adapted for horizontal flight; rotatable hub means including a pair of fixed rigid arms and having a substantially vertical axle adapted to be driven at uniform angular velocity, a plurality of elongated blades arranged horizontally in spaced relation to each other and pivoted to said arms and rotatable therewith, said blades being located substantially in a common horizontal plane and being movable for lead and lagging blade movements in said plane, control means including a pair of connecting elements pivotally connected to said blades and adapted to effect predetermined movements thereof in said common plane and relative to said hub means, whereby said blades may be adjusted in position relative to said hub means for overcoming non-uniform effects of air flowing past said blades during rotation of said hub means and concurrent horizontal flight of said aircraft, said control means further including a pivot pin, having an axis parallel to the axis of said hub means, and adjustable radially relative to the axis of said hub means, said pin being fixed against rotation with said hub means, said connecting elements being pivoted to said pin and being oscillatable during rotation of said hub means, bell crank lever means pivoted to said connecting elements and said arms for translating oscillatable movements into swinging movements of said blades, means selectively operable to shift said pivot pin radially relative to said hub means, and means selectively operable to vary the direction of such radial shifting of said pivot pin.

2. In a rotary blade system for aircraft adapted for horizontal flight; rotatable hub means including a pair of fixed rigid arms and having a substantially vertical axle adapted to be driven at uniform angular velocity, a plurality of elongated blades arranged horizontally in spaced relation to each other and pivoted to said arms and rotatable therewith, said blades being located substantially in a common horizontal plane and being movable for lead and lagging blade movements in said plane, control means including a pair of connecting elements pivotally connected to said blades and adapted to effect predetermined movements thereof in said common plane and relative to said hub means, whereby said blades may be adjusted in position relative to said hub means for overcoming non-uniform effects of air flowing past said blades during rotation of said hub means and concurrent horizontal flight of said aircraft, said control means further including a pivot pin spaced from and located in an eccentric position relative to said hub means, said connecting elements being pivoted to said pin and being oscillatable during rotation of said hub means, bell crank lever means pivoted to said connecting elements and said arms for translating oscillatable movements into swinging movements of said blades, said hub means being mounted on a rotatable gimbal, said control means including a ball and socket joint located on said axle and above said gimbal, and lever means connected to said ball and socket joint and to said blades, whereby, when a horizontal air gust impinges on said blades, said hub means will be tilted, thereby creating an eccentricity of said ball and socket joint with respect to the center of said gimbal, and said lever means due to said eccentricity will impart to said blades said predetermined movements thereof.

3. A system as set forth in claim 2, further characterized in that said gimbal comprises a cardan ring pivotally journalled about an axis, and laterally extending arms, on which said ring is suspended.

4. A system as set forth in claim 2, further characterized in that said gimbal comprises a cardan ring pivotally journalled about an axis, laterally extending arms, on which said ring is suspended, and weights provided at the ends of said arms.

5. A system as set forth in claim 2, further characterized in that said gimbal comprises a cardan ring pivotally journalled about an axis, laterally extending arms, on which said ring is suspended, and weights provided at the ends of said arms, said ring, said axis and said arms being in a plane perpendicular to said axle.

6. In a rotary blade system for aircraft adapted for horizontal flight; rotatable hub means including a pair of fixed rigid arms and having a substantially vertical axle adapted to be driven at uniform angular velocity, a plurality of elongated blades arranged horizontally in spaced relation to each other and pivoted to said arms and rotatable therewith, said blades being located substantially in a common horizontal plane and being movable for lead and lagging blade movements in said plane, control means including a pair of connecting elements pivotally connected to said blades and adapted to effect predetermined movements thereof in said common plane and relative to said hub means, whereby said blades may be adjusted in position relative to said hub means for overcoming non-uniform effects of air flowing past said blades during rotation of said hub means and concurrent horizontal flight of said aircraft, said control means further including a pivot pin, having an axis parallel to the axis of said hub means, and adjustable radially relative to the axis of said hub means, said pin being fixed against rotation with said hub means, said connecting elements being pivoted to said pin and being oscillatable during rotation of said hub means, bell crank lever means pivoted to said connecting elements and said arms for translating oscillatable movements into swinging movements of said blades, a guide rail perpendicular to the axis of said hub means and fixed against movement relative to the aircraft, a guide member slidable longitudinally of said guide rail, said pivot pin being mounted on said guide rail, and mechanism operable to adjust said guide member along said guide rail.

7. A system as set forth in claim 6, in which said mechanism includes manually operable lever means for adjustably positioning said guide member along said guide rail.

References Cited in the file of this patent

UNITED STATES PATENTS 2,957,526     Derschmidt  ------------ Oct. 25, 1960